United States Patent Office 3,284,306
Patented Nov. 8, 1966

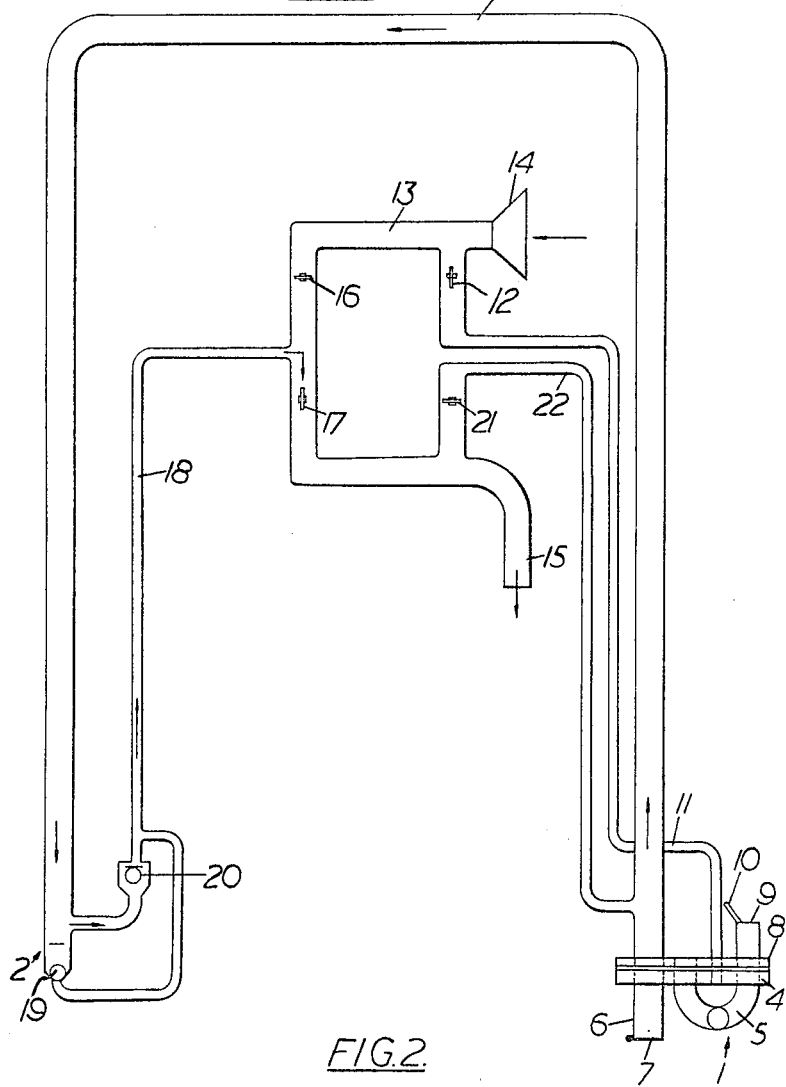
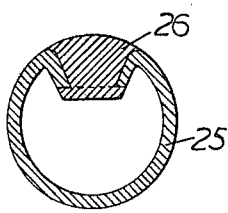

3,284,306
NUCLEAR IRRADIATION INSTALLATION
Imre Balla, Yad Eliahu, Tel Aviv, Israel, assignor to The State of Israel, Ministry of Defence, Tel Aviv, Israel
Filed Feb. 26, 1964, Ser. No. 347,521
Claims priority, application Israel, Mar. 24, 1963, 18,904
5 Claims. (Cl. 176—15)

This invention relates to nuclear irradiation installations of the kind associated with nuclear reactors for the purpose of fast neutron irradiation of relatively small samples. Particular problems are involved in the irradiation of small samples as compared with the irradiation of large samples. Thus, small samples require comparatively short irradiation periods and in consequence the installations must be capable of rapid functioning. Furthermore, in order to render the functioning of the reactor relatively economical it is desirable that the installation should be capable of providing for the simultaneous irradiation of as many small samples as possible.

It is an object of the present invention to provide a nuclear irradiation installation in which the above mentioned requirements are largely satisfied.

According to the present invention, there is provided a nuclear irradiation installation comprising a receiving station and a processing station, the latter being located in the vicinity of the core of the reactor, one or more conveyor ducts communicating with said stations, a pneumatic system coupled to the conveyor ducts so as to create a suction therein, one or more control valves arranged to control the direction of said suction to or from said processing station, and a plurality of spherical containers adapted to contain samples to be irradiated and to move in said conveyor ducts.

With such an installation, the employment of a pneumatic system allows for the rapid functioning of the installation whilst the particular shape of the containers (spherical) leads to a considerable economy in space in view of the fact that spherical containers can move in ducts having relatively sharp bends and in consequence the ducts themselves can be made comparatively compact. Thus, by virtue of the compactness of the ducts several installations can be accommodated in the very limited space in the region of the reactor core.

Furthermore, the spherical shape of the containers which are preferably formed of a plastic material, allows for a maximum strength of container for a minimum quantity of container material. The containers can be made relatively light and do not substantially interfere with the irradiation of the samples contained therein or with the subsequent observation and measurements to be carried out on the irradiated samples.

The spherical shape of the containers assures an easy, smooth passage thereof through the conveyor ducts and substantially precludes the possibility of their getting stuck therein.

The invention will now be described by way of example and with reference to the accompanying drawings, in which:

FIG. 1 is a schematic diagram of the installation, and
FIG. 2 is a cross-sectional view of one form of plastic spherical container in accordance with the invention.

As seen in FIG. 1 of the drawings, the installation comprises a receiving station indicated generally by the reference numeral 1 and a processing station 2. The two stations are coupled by a conveyor duct 3. The receiving station includes a displaceable coupling box 4 provided with a U-shaped coupling duct 5 (shown with an unmarked spherical container resting in the U thereof) and an outlet port 6 having a pivoted sealing flap 7 normally biased into the illustrated closed position. The coupling box 4 is displaceable laterally with respect to a terminal member 8 to which are respectively secured the duct 3 and an inlet port 9 having a pivoted sealing flap 10, normally closed but shown in the open loading position in FIG. 1.

A pneumatic system comprises a pneumatic duct 11 coupled at its lower ends to the terminal member 8 and at its upper end, via a valve 12 with a conduit 13 one end 14 of which is open to the atmosphere and the other end 15 of which is adapted to be connected to a suction pump (not shown). The conduit 13 is provided with a pair of spaced apart valves 16 and 17 and a branch conduit 18 branches off from the conduit 13 at a position intermediate the valves 16 and 17. The conduit 18 leads on the one hand to the lower end of the conveyor duct 3 at processing station 2. This conduit 18 has two branches, one of which connects to the bottom of conveyor duct 3 at the seat of ball valve 19; the other branch contains ball valve 20 and communicates with the conduit 3 at a position upstream of the ball valve 19. Both ball valves have constraining means, indicated in FIG. 1 by short horizontal lines above the circles indicating the balls, as is conventional, to retain the respective balls captive when the pneumatic flow direction is such as to lift either of them off its seat. The stop for the ball of valve 19 also serves as a stop or support for a sample container at the processing station. The conduit 13 on the other hand, branches off at a position downstream of the valve 17 and via a further valve 21 in the form of a further conduit 22 which leads into the duct 3 at a position thereof adjacent the receiving station 1.

In operation, and with the coupling box in the disposition shown in FIG. 1 of the drawings, a spherical container containing the sample to be irradiated is dropped via the inlet port into the coupling duct 5. The coupling box 4 is then displaced to the left so that the left-hand limb of the coupling duct communicates with the conduit 3 whilst the right-hand limb communicates with the conduit 11. At the same time, the valves 12 and 17 are opened whilst the valves 16 and 21 remain shut. As a result suction of air takes place through the end 15 of the conduit 13 via the open valve 17, conduit 18, open valve 20 and thence through the conduit 3 in the direction of the processing station 2. As a result of this suction, the container passes into the conduit 3 and is directed towards the processing station 2. In view of the fact that the suction duct 18 communicates with the conduit 3 at a position in advance of the ball valve 19, the momentum of impact of the container at the processing station 2 is reduced due to the presence there of an air cushion.

With the arrival of the sample in its spherical container at the processing station, irradiation proceeds for the required length of time and when this is over, the valves 12 and 17 are closed whilst the valves 16 and 21 are opened. In consequence, a suction is developed in the conduit 3 which is directed from the processing station 2 towards the receiving station 1. As a result the spherical container moves from the processing to the receiving station and the coupling box is moved back so that the outlet port 6 communicates with the duct 3 thereby allowing the container to drop out of this duct.

FIG. 2 shows a convenient form of spherical container formed of polyethylene in two parts, namely, a main container 25 and a plug 26 adapted to seal the container. As can be seen the container 25 has a tapered opening into which the sealing plug 26 can fit in a self-locking manner. Where the container is adapted to carry solid samples the container does not need any additional sealing other than the secure fixing of the plug 26 in the opening. For additional safety, however, the plug 26 can be heat welded to the body of the container 23. Where, however, the sample is a liquid, this liquid can first of all be enclosed in a leak proof polyethylene bag which is then inserted into the spherical container.

The valves 12, 16, 17 and 21 can suitably be solenoid operated valves which can be automatically actuated so as to allow for the transport of the container to the processing station when the latter is inserted into the inlet duct and actuated in the opposite direction so as to allow for the transport of the container from the processing to the receiving station either manually or by a time switch which operates after the containers and their samples have received the required duration of radiation. Furthermore, these valves can be electrically coupled to an actuating mechanism responsively connected to the outlet flap 7, so that when the latter is opened as a result of the exit of a container the valves are automatically set into a neutral position.

I claim:

1. In a nuclear irradiation installation, a conveyor duct, extending from the exterior to the interior of an irradiation zone provided thereby, for transporting containers of materials to be irradiated at a processing station therein, a pneumatic system interconnected to the conveyor duct and having a source of gas and an exhaust for the gas and having valve means to control the direction of flow of the gas from the source through the duct and out the exhaust, the pneumatic system including a pair of branch lines interconnecting to the duct at spaced intervals before and after the portion of the duct providing the processing station, and the valve means including a check valve in the after branch line effective to preclude gas flow past the processing station into that line from the duct while gas flow is permitted by the valve system from the duct into the before branch line, the portion of the duct between the respective branch line interconnections providing a non-circulating gas region for cushioning the approach of containers of materials for irradiation thereat.

2. In a nuclear irradiation installation, the combination of a conveyor duct, extending from the exterior to the interior of an irradiation zone provided thereby for transporting containers of materials to be irradiated therein, a terminal portion of the duct located within the zone providing a processing station for such containers therein, a spherical container fitting snugly and movably therein for containing and transporting material to be irradiated therein, and a pneumatic system interconnected to the duct to force the container through the duct in first a forward direction and then a reverse direction, the duct having a portion thereof providing a temporary rest position for the container in an irradiation zone in the installation, the pneumatic system including valve means effective to provide a non-circulating gas region in the portion of the duct providing the temporary rest position upon gas flow in the forward direction.

3. A nuclear irradiation installation comprising a receiving station located outside the irradiation zone of the installation to receive containers of samples to be irradiated, and a processing station inside the irradiation zone, a conveyor duct communicating with said stations, a pneumatic evacuation system coupled to the conveyor duct so as to create a suction therein, said pneumatic system being coupled by a pair of branch lines, each being provided with one of a pair of check valves to the conveyor duct, respectively in advance and to the rear of the processing station, the intervening portion of the conveyor duct providing an air cushion between the loci of interconnection of the respective branches therewith in the closed position of the second valve when the pneumatic system is coupled for air flow through the duct from the receiving station toward the processing station, control valves arranged to control the direction of air flow in the conveyor duct with respect to said processing station, and a sample container of spherical shape fitting movably in the conveyor duct.

4. In a nuclear irradiation installation, a conveyor duct, extending from the exterior to the interior of an irradiation zone provided thereby, for transporting containers of materials to be irradiated therein, a portion of the duct located within the zone providing a processing station for such containers temporarily at rest therein, and a portion of the duct located outside the zone providing a receiving station for such containers, the latter portion having at its end located outside the irradiation zone a coupling box provided with a U-shaped coupling duct and an outlet port having a pivoted sealing flap, the coupling box being displaceable with respect to a terminal member having connected thereto the outside end of the conveyor duct and provided with an inlet port, the coupling box being displaceable from and to two positions, in one of which the end of the conveyor duct interconnects to the outlet port, and in the other of which the end of the conveyor duct interconnects to the inlet port via the coupling.

5. In a nuclear irradiation installation, a conveyor duct, extending from the exterior to the interior of an irradiation zone provided thereby, for transporting containers of materials to be irradiated therein, a portion of the duct located within the zone providing a processing station for such containers temporarily at rest therein, and a portion of the duct located outside the zone providing a receiving station for such containers, the latter portion having at its end located outside the irradiation zone a coupling box provided with a U-shaped coupling duct and an outlet port having a pivoted sealing flap, the coupling box being displaceable with respect to a terminal member having connected thereto the outside end of the conveyor duct and provided with an inlet port, the coupling box being displaceable from and to two positions, in one of which the end of the conveyor duct interconnects to the outlet port, and in the other of which the end of the conveyor duct interconnects to the inlet port via the coupling duct, and wherein the coupling duct interconnects to the inlet port in the first position and interconnects in the second position to a line of the pneumatic system to provide air flow therethrough and through the conveyor duct toward the processing portion thereof.

References Cited by the Examiner

UNITED STATES PATENTS

| | | | |
|---|---|---|---|
| 2,349,177 | 5/1944 | Kopitke | 18—5 |
| 2,874,107 | 2/1959 | Ohlinger et al. | 176—15 |
| 2,910,416 | 10/1959 | Daniels | 176—17 |
| 3,043,354 | 7/1962 | Fitzgerald | 105—0.5 |
| 3,136,697 | 6/1964 | Arnold et al. | 176—15 |
| 3,156,279 | 11/1964 | Grebowiec et al. | 105—0.5 |

OTHER REFERENCES

Peaceful Uses of Atomic Energy, vol. 2, pp. 267 and 309, 1956.

Borst, patent application Number 552,558 (1935 series), filed Sept. 2, 1944, abstract published 657 O. G. 1582, April 29, 1952.

L. DEWAYNE RUTLEDGE, *Primary Examiner.*

REUBEN EPSTEIN, CARL D. QUARFORTH,
*Examiners.*

J. V. MAY, H. E. BEHREND, *Assistant Examiners.*